Patented Jan. 4, 1949

2,458,001

UNITED STATES PATENT OFFICE 2,458,001

METHOD OF PREPARING AN ELASTOMER

Iral B. Johns, Ames, Iowa, assignor to Iowa State College Research Foundation, Ames, Iowa, a corporation of Iowa No Drawing. Original application December 11, 1942, Serial No. 468,691. Divided and this application September 12, 1945, Serial No. 615,921

5 Claims. (Cl. 260—345)

This invention relates to an elastomer and a method of preparing the same, and more particularly to a polymerized material forming a synthetic rubber and possessing characteristics similar to those of natural rubber.

In accordance with the present invention, an elastomer or synthetic rubber is easily and readily prepared from furfural, which in turn is obtained by digesting agricultural waste materials with acid. With this process, the natural product is readily converted by successive steps of treatment to synthetic rubber.

The invention contemplates the hydrogenation of furfural to reduce the aldehyde radical thereof, and also to saturate the unsaturated double bonds of the furfural, and the subsequent dehydration of the product to form piperylene. The piperylene is then polymerized to form the elastomer or synthetic rubber.

The broad steps of the invention include the catalytic hydrogenation of furfural to reduce the aldehyde radical and form sylvan. The product of this hydrogenation is subjected to further catalytic hydrogenation to saturate the unsaturated double bonds of the product and produce tetrahydrosylvan. Subsequently, the hydrogenated product is subjected to catalytic dehydration to form a product having a conjugated double bond system, the product consisting predominantly of piperylene. The elastomer or synthetic rubber is obtained from the piperylene by suitable catalytic polymerization thereof.

Furfural, which is the ingredient with which the process is begun, is a product which is obtained in commerce by the acid digestion of oat hulls and is a liquid boiling at approximately 160° C. Since furfural can be produced from a great many waste agricultural materials, including oat hulls, the source is almost unlimited.

In the first step of the reaction, furfural in the vapor phase is mixed with an excess of hydrogen at a temperature above the boiling point of furfural, the temperature preferably being in the neighborhood of 200° C.–225° C. The reaction is carried out in the presence of a suitable catalyst, such as finely-divided metallic copper which has been reduced from cupric hydroxide on a charcoal bed or on a copper screen support. Preferably, the reaction is carried out by passing hydrogen through a bath of liquid furfural, so that the furfural will be entrained by the hydrogen, and passing the vapor phase mixture of furfural and hydrogen through a suitable furnace containing the catalyst, the furnace being maintained at the desired temperature. Since a large excess of hydrogen is preferably used, the excess hydrogen may be recirculated and again passed through the furfural bath and the reaction furnace. In the operation of this step, it has been found that approximately three times as much hydrogen is passed through the furnace as is reacted with the furfural.

Although any suitable catalyst may be used for the reaction, a catalyst consisting of finely-divided metallic copper on a charcoal bed has been found to be particularly desirable. This catalyst may be prepared by chemically precipitating cupric hydroxide on charcoal and then heating the charcoal in an atmosphere of hydrogen to a temperature of approximately 210° C. to reduce the cupric hydroxide to metallic copper. The resulting product, including the charcoal catalyst bed, may be placed in the furnace where it will act as a catalyst for the reaction.

The reaction between the furfural and hydrogen results in a product consisting predominantly of sylvan. In this product, the aldehyde radical of the furfural has been reduced to a methyl radical. The sylvan may be obtained by passing the gaseous product from the reaction furnace through a suitable condensing bath. When the product is condensed, it will be found to separate into two layers, in which the water formed in the reaction and unreacted furfural provide the lower layer, while the sylvan is found in the upper layer. The sylvan may be separated by any suitable method, such, for example, as distillation. In the reaction, it is theoretically possible to obtain furfuryl alcohol, but under the reaction conditions set forth the amount of furfuryl alcohol produced is very small.

The product of the first step of the reaction, which consists predominantly of sylvan, is then subjected to further catalytic hydrogenation. In this step of the reaction, the sylvan is mixed in the vapor phase with an excess of hydrogen at an elevated temperature in the presence of a suitable catalyst, such, for example, as a partially-activated nickel catalyst. The sylvan may be mixed with the hydrogen by passing the gaseous hydrogen through a liquid bath of the sylvan to entrain the sylvan, and the mixture may then be passed through a reaction furnace which may be maintained at a temperature of 112° C.–135° C. and is preferably maintained at a temperature of 115° C.–120° C. The excess hydrogen is recirculated for the reaction.

A suitable catalyst for this step of the reaction may be prepared by subjecting a powdered nickel-aluminum alloy, of the type known as "Raney nickel," to a partial activation with an alkali, such as sodium hydroxide. The nickel-aluminum alloy may be placed in a dilute solution of sodium hydroxide in which there is only sufficient sodium hydroxide present to dissolve a portion of the aluminum. For example, 40 gms. of the nickel-aluminum alloy may be placed in a solution containing approximately 5 gms. of sodium hydroxide. The partial activation of the catalyst is important in this step of the reaction since if the catalyst is subjected to treatment with a concentrated solution of sodium hydroxide, the reaction will produce a decomposition of the sylvan and result in the formation of methane which, when mixed with hydrogen, will prevent any further reaction.

It may be possible to use other catalysts for the hydrogenation of the sylvan. For example, a catalyst consisting of powered nickel prepared by the reduction of nickel oxide precipitated on charcoal by ammonium carbonate, may be used. Nevertheless, the partially-activated Raney nickel catalyst has been found to be particularly suitable for this process.

In the next step of the reaction, the tetrahydrosylvan or the hydrogenated product is subjected to catalytic dehydration to form a product having a conjugated double bond system. This product is formed by heating the tetrahydrosylvan in the presence of a dehydrating catalyst, such as a phosphate salt having weakly acid reaction. A suitable catalyst for this purpose is mercuric phosphate precipitated on a bed of granular aluminum oxide. The reaction is preferably carried out at a temperature in the neighborhood of 325° C. An inert gas, such as nitrogen, may be passed through a bath of liquid tetrahydrosylvan, and by entrainment will carry the tetrahydrosylvan through the reaction chamber which may be heated to the desired temperature. The catalyst is placed in the reaction chamber, and the tetrahydrosylvan is converted to piperylene, which is also known as 1-methyl butadiene or as 1,3-pentadiene. At the same time a certain amount of 1,4-pentadiene is produced. This substance, having a boiling point of 25° C., can be separated from 1,3-pentadiene boiling at 42° C. by fractional distillation. The amount of 1,4-pentadiene formed compared to the amount of 1,3-pentadiene formed in a given reaction has been found to depend somewhat on the conditions of the reaction.

A suitable catalyst for this reaction may be prepared by reacting mercuric chloride with trisodium phosphate in an aqueous solution to precipitate mercuric phosphate. Preferably, the precipitate is collected on a bed of granular activated aluminum oxide.

The piperylene may be polymerized in the presence of any suitable catalyst to form an elastomer. For example, the piperylene, which is a liquid boiling at 42° C., may be emulsified in an aqueous solution of an emulsifying agent of mildly alkaline reaction, such as sodium or ammonium oleate alone or with styrene or acrylonitrile or any suitable substance as a copolymer. A suitable peroxide may be used as a catalyst in the reaction. For example, such a catalyst as ammonium persulfate or sodium perborate may be added, and after shaking and heating to about 75° C. for a period of about 48 hours a latex-like emulsion is obtained. Dilute acetic acid causes coagulation of the emulsion. The soft mass, after washing, possesses characteristics similar to those of natural rubber. It possesses elastic properties and softens on heating and stiffens on cooling. It can be successfully vulcanized to form a truly rubber-like substance. The piperylene, in the liquid state, has also been polymerized directly by means of anhydrous aluminum chloride.

The present application constitutes a division of my copending application, Serial Number 468,691, filed December 11, 1942, for Elastomer and method of preparing the same, now abandoned.

Although the process and product have been described in connection with a specific embodiment of the invention, it will be apparent that this is for the purpose of illustration only and changes and modifications may be made without departing from the spirit and scope of the invention.

I claim:

1. A process for the production of sylvan which comprises the passing of hydrogen through a bath of liquid furfural to substantially saturate the hydrogen with furfural and the passage of the furfural-laden hydrogen at a temperature above 160° C. over a reduced copper hydroxide catalyst reduced at a temperature of about 210° C.

2. A process for the production of sylvan which comprises the passage of furfural-laden hydrogen at a temperature above 160° C. over a reduced copper hydroxide catalyst deposited upon a carrier, said copper hydroxide being reduced at a temperature of about 210° C.

3. A process for the production of sylvan which comprises the passage of furfural-laden hydrogen at a temperature of 160° C. over a reduced copper hydroxide catalyst deposited upon charcoal, said copper hydroxide being reduced at a temperature of about 210° C.

4. A process for the production of sylvan which comprises the passing of hydrogen through a bath of liquid furfural to substantially saturate the hydrogen with furfural and the passage of the furfural-laden hydrogen at a temperature of 200° to 225° C. over a reduced copper hydroxide catalyst, the copper hydroxide being reduced at a temperature of about 210° C.

5. A process for the production of sylvan which comprises the passage of furfural-laden hydrogen at a temperature of 200° to 225° C. over a reduced copper hydroxide catalyst deposited upon a carrier, the copper hydroxide being reduced at a temperature of about 210° C.

IRAL B. JOHNS.

REFERENCES CITED

The following references are of record in the file of this patent:

UNITED STATES PATENTS

| Number | Name | Date |
|---|---|---|
| 1,400,247 | Steffens | Dec. 13, 1921 |
| 1,739,919 | Ricard et al. | Dec. 17, 1929 |
| 2,034,077 | Arnold | Mar. 17, 1936 |
| 2,077,422 | Lazier | Apr. 20, 1937 |
| 2,120,958 | Coons | June 14, 1938 |
| 2,273,484 | Guinot | Feb. 17, 1942 |

Certificate of Correction

Patent No. 2,458,001.  January 4, 1949.

IRAL B. JOHNS

It is hereby certified that error appears in the printed specification of the above numbered patent requiring correction as follows:

Column 3, line 19, for the word "powered" read *powdered*;

and that the said Letters Patent should be read with this correction therein that the same may conform to the record of the case in the Patent Office.

Signed and sealed this 3rd day of May, A. D. 1949.

[SEAL]

THOMAS F. MURPHY,
*Assistant Commissioner of Patents.*